(12) United States Patent
Pan

(10) Patent No.: US 8,148,844 B2
(45) Date of Patent: Apr. 3, 2012

(54) POWER SUPPLY SYSTEM INCLUDING ALTERNATIVE SOURCES

(76) Inventor: Yang Pan, Shanghai (CN)

( * ) Notice: Subject to any disclaimer, the term of this patent is extended or adjusted under 35 U.S.C. 154(b) by 299 days.

(21) Appl. No.: 12/623,416

(22) Filed: Nov. 22, 2009

(65) Prior Publication Data

US 2011/0121648 A1 May 26, 2011

(51) Int. Cl.
H02J 1/10 (2006.01)
H02J 3/00 (2006.01)
H02J 3/14 (2006.01)
H02M 1/10 (2006.01)

(52) U.S. Cl. ............................. 307/29; 307/65
(58) Field of Classification Search .................. 307/29, 307/43, 65, 80, 18
See application file for complete search history.

(56) References Cited

U.S. PATENT DOCUMENTS

| 4,718,233 | A | 1/1988 | Barrett |
| 6,678,176 | B2 | 1/2004 | Lumsden |
| 2002/0171391 | A1 | 11/2002 | Batts-Gowins |
| 2003/0051476 | A1 | 3/2003 | Reno |
| 2007/0013340 | A1 | 1/2007 | Mattichak |
| 2007/0221267 | A1 | 9/2007 | Fornage et al. |
| 2007/0296276 | A1 | 12/2007 | Blackman |
| 2008/0029153 | A1 | 2/2008 | Margalit |
| 2008/0143188 | A1 | 6/2008 | Adset et al. |
| 2009/0093916 | A1* | 4/2009 | Parsonnet et al. ............ 700/286 |

* cited by examiner

Primary Examiner — Jared Fureman
Assistant Examiner — Carlos Amaya

(57) ABSTRACT

A power supply system for a residential or a commercial unit is disclosed. The system comprises an AC power source from a power grid, a DC power source from one or a plurality of remote alternative power sources and another DC power source from one or a plurality of local alternative power sources. The generated DC power from the remote sources is delivered to the unit using a dedicated DC power distribution unit. The alternative power sources either locally or remotely located to residential or the commercial unit may comprise one or a plurality of solar systems. The system may also comprise one or a plurality of wind turbines. There are two groups of electrical appliances from the unit connected to the system. The first group receives the AC power only and the second group receives the AC and/or the DC powers. A power management device for the unit selects the power supply sources to minimize the power consumption from the AC power grid.

13 Claims, 7 Drawing Sheets

POWER SUPPLY SYSTEM INCLUDING ALTERNATIVE SOURCES

CROSS-REFERENCE TO RELATED APPLICATIONS

The application is related to the applications 12577152 and 12581136.

BACKGROUND

1. Field of Invention

This invention relates to a power supply system, specifically to a power supply system including an AC source from a power grid and DC sources from local and remote alternative power sources.

2. Description of Prior Art

In recent years, concerns have been raised that high demand for electricity taxing the capacity of existing electricity generating plants. Furthermore, concerns regarding the availability and environmental safety of fossil and nuclear fuel are being raised. As a result of the above factors, the price of electricity has been on a path of steady increasing.

Furthermore, the electrical utility industry has for some time labored under the problem of supplying cost effective power to comply system peak-demand period requirements. The concept of peak-demand power supplementation is not new. A number of systems have been tested and implemented over years based upon batteries, hydroelectric, and combustion turbine. Each of the systems, by nature or by implementation, has had problems. Some are expensive and others are not acceptable environmentally.

Solar systems have been used with gained popularity to resolve at least partially the peak-demand issue of the power grid. A solar system may convert generated DC electricity from solar panels into AC electricity and be used to power electrical appliance. The generated DC power may be purchased by a power grid company after it is converted into AC power by utilizing an inverter. Over the years inverters have progressed from electromechanical to semiconductor devices. The use of the inverters not only causes the loss of electrical power but also the increase of overall cost of the solar system.

In addition to the solar systems, wind turbines have also been employed to provide clean energy. The wind turbine generates an AC power from the kinetic energy of the wind through a system comprises a rotator, a gearbox and a generator. The AC power is rectified into a DC power and is further converted into AC power with the same frequency as the AC power from the power grid. The inverter is used to convert the DC power into the AC power, which results in a loss of electricity and also in an increase in the cost.

It is desirable to have a system and method for utilizing the solar energy and/or wind turbines to supplement the AC power from the power grid while eliminating the use of the inverters to reduce the cost of employing the alternative power sources.

SUMMARY OF THE INVENTION

It is therefore an object of the present invention to provide a power supply system to minimize the use of the AC power from the power grid by consuming the DC power from local alternative power sources as the first priority and the DC power from remote alternative power sources as the second priority.

It is another object of the present invention to provide a low cost method of utilizing powers generated from local or remote alternatives sources without using inverters.

The power supply system based upon the present inventive concept comprises a first means of power supply based upon AC power from the power grid, a second means of power supply based upon alternative power sources in remote sites and a third means of power supply based upon DC power generated from local alternative power sources. The alternative power sources may comprise the solar systems and/or the wind turbines.

The power consumption unit may include multiple residential and/or commercial units. There may be two groups of electrical appliances in the units connecting to the power supply system. The first group of appliances receives the AC power supply only and the second group of appliances receives the AC and/or DC power supplies. A switch is used to connect the second group of appliances to the DC power as it is available. A power management device of the consumption unit comprises a demand detector for detecting required DC power for the second group of the appliances and a supply detector for detecting the available DC power. A controller controls an operation to minimize the power consumption from the power grid. The units always consume the DC power either generated locally or generated remotely as the priority. According to one aspect of the invention, a battery may be used to store the surplus DC power. The battery may also be used as a supplementary for powering the appliances form the second group. According to another aspect of the invention, the surplus DC power generated by the local alternative sources may also be sent to the DC power distribution unit to power operations of electrical appliances of other power consumption units.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
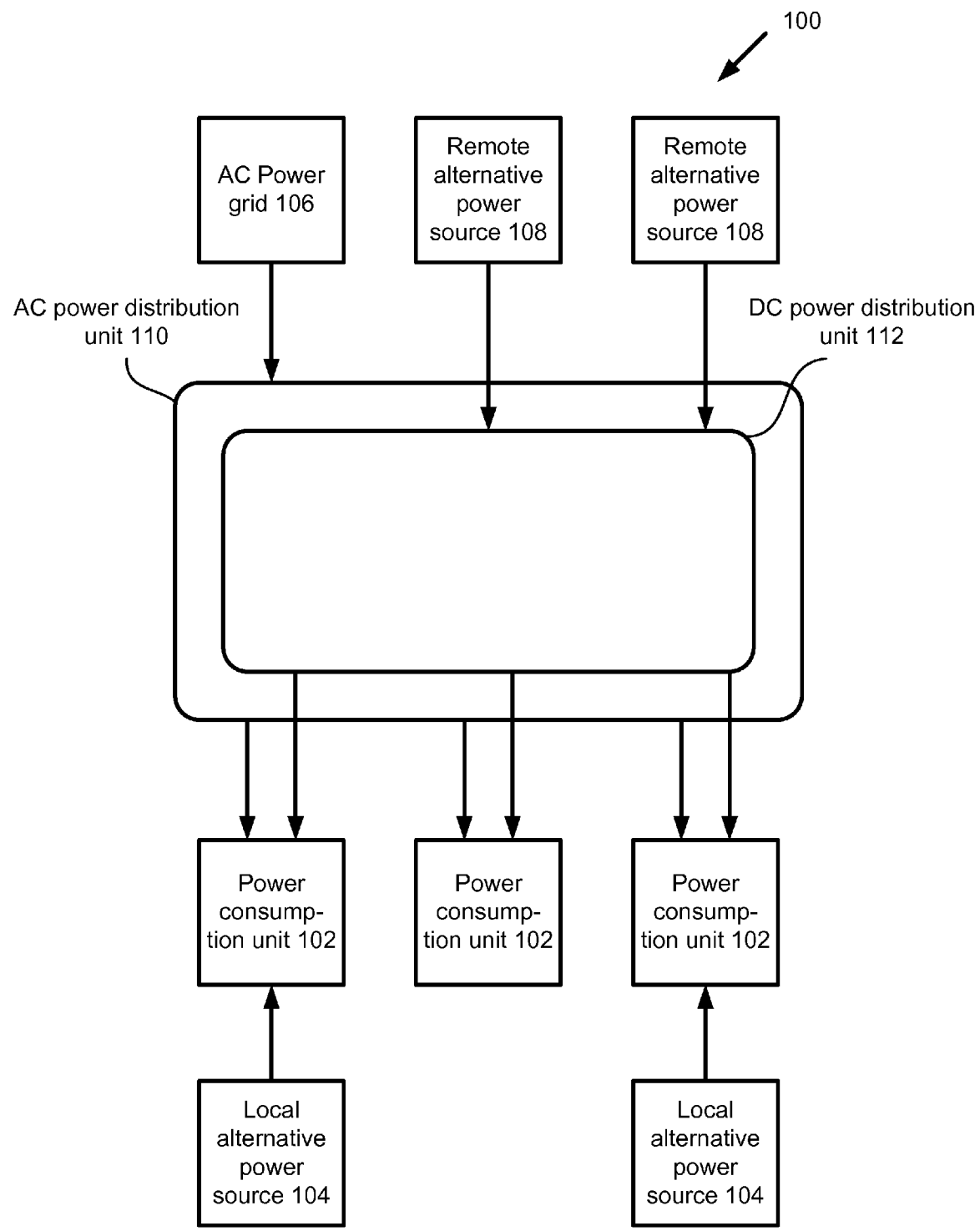
FIG. 1 is a schematic diagram of a power supply system comprising the AC power from a power grid and the DC power from local and remote alternative power sources.

FIG. 1 is a schematic diagram of a power supply system. The system 100 comprises a plurality of power consumption units 102. The consumption unit 102 may be a residential unit such as for example, a house. The consumption unit 102 may also be a commercial unit such as for example, a shopping mall or an office. Some of the power consumption units may further be connected to a local alternative power source 104. 104 may be a solar system and/or a wind turbine providing the DC electrical power. The solar system generates the DC electrical output based upon well known photovoltaic effects. The wind turbine converts the kinetic energy into the mechanical energy by a rotator and a gearbox and further converts the mechanical energy into the AC electricity by a generator. The generated AC electricity is typically not in the same frequency as the AC electricity from a power grid and therefore cannot be consumed directly. A rectifier is used to convert the AC power into the DC power. In some applications, the DC power is further converted into the AC power with the same frequency as the power grid by an inverter. In the present invention, the DC power generated from the wind turbines may be employed directly. The cost of employing the alternative power source 104 is reduced significantly by eliminating the use of inverters. The system 100 further comprises an AC power grid 106 and one or multiple remote alternative power sources 108. 108 may be a solar system or a wind turbine system. The AC power is distributed by an AC power distribution unit 110 including conventional AC power transmission lines. The generated DC power from the remote alternative power sources is delivered to the power consumption unit 102 through a DC power distribution unit 112. The DC power distribution unit 112 may comprise dedicated DC power transmission lines. Each power consumption unit 102 may be connected to both the AC and the DC power sources.

Figure 2:
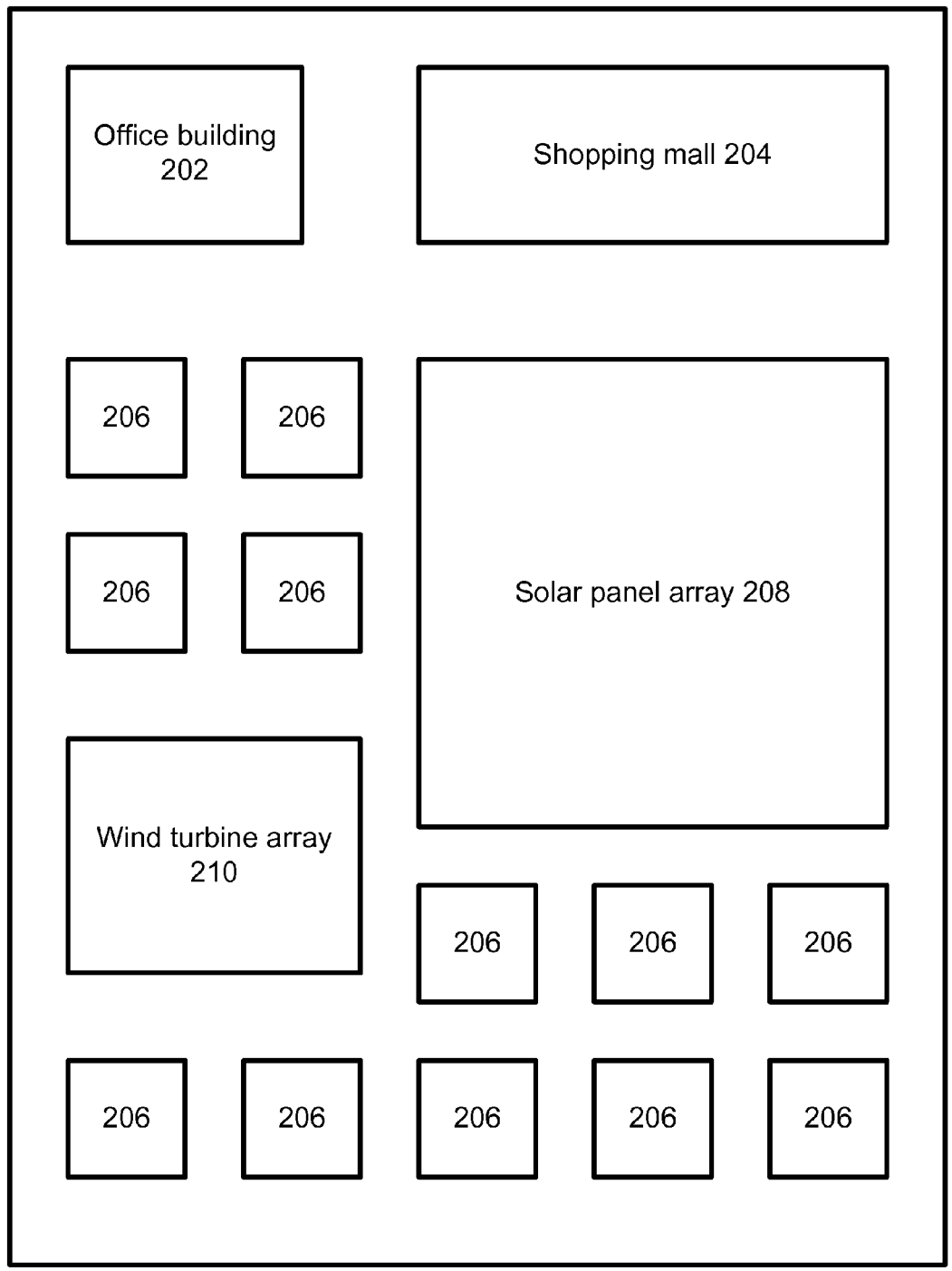
FIG. 2 is a schematic diagram illustrating a layout of an exemplary implementation of the power supply system including a solar panel array and a wind turbine array as the remote alternative power sources.

FIG. 2 is a schematic diagram illustrating some aspects of the power supply system 100. An exemplary layout of a residential area is illustrated. The area may include an office building 202, a shopping mall 204 and multiple residential units 206. In the exemplary case, the area includes two open spaces. One of them is used to install a solar panel array 208 and another is used to install a wind turbine array 210. The solar array 208 and the wind turbine array 210 generate DC electrical power. The generated power may be delivered to the commercial units 202/204 and the residential units 206 through the DC power distribution unit 112. The generated power may also be delivered to other power consumption units in other areas. It should be noted that solar systems may also be installed on the roof of each residential unit 206. The solar system may also be installed on the roof of the commercial units 202 and/or 204. The generated DC power from such a local DC power source may be consumed by electrical appliances in the unit.

The solar panel array 208 may be movable. There may be temporarily open space in a residential area. The space may be employed to generate electricity by moving-in a solar panel array. The generated electrical power may be consumed by the residential units near the array or be delivered to other units through the DC power distribution unit. The generated DC power is preferably consumed by the units nearby to prevent power loss during the transmission.

Figure 3:
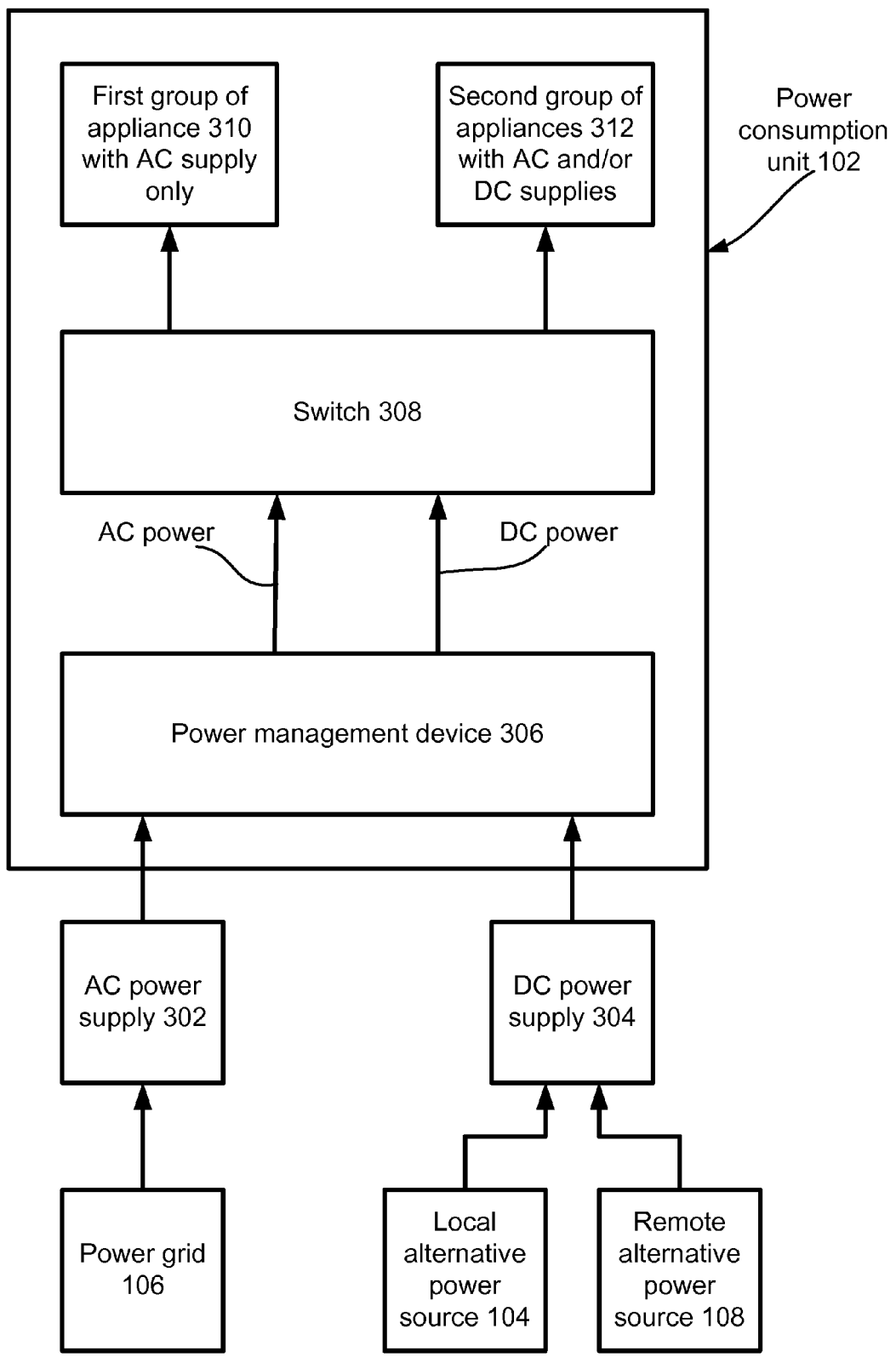
FIG. 3 is a schematic diagram of the power consumption unit connected to both the AC and DC power sources.

FIG. 3 is a schematic diagram of a power consumption unit connected to both the AC and DC power sources. The power consumption unit 102 is connected to an AC power supply 302 and a DC power supply 304. The AC power supply 302 supplies the AC power from the power grid 106. The DC power supply 304 supplies the DC power from the local alternative power source 104 and the remote alternative power source 108. The alternative power sources may comprise one or multiple solar systems. They may also comprise one or multiple wind turbines. If more than one power sources are used for the alternative source 104, the DC power supply 104 may include a feature to combine all DC power sources to convert into a single DC output.

The power consumption unit 102 further comprises a power management device 306 for processing the incoming powers from 302 and 304 and for delivering the processed power to the electrical appliances through a switch 308. There are two groups of electrical appliances used in the system 100. The first group of appliance 310 receives the AC power supply only. It means that the first group of appliances can only take the AC power for their operations. The AC power is the power from the power grid 106. The second group of appliance 312 receives the AC and/or the DC power supplies. It means that the appliances of the second group may receive both AC and DC power supplies for their operation. The second group of appliances, therefore, can consume DC power from the local alternative power source 104 and the remote alternative power source 108.

Figure 4:
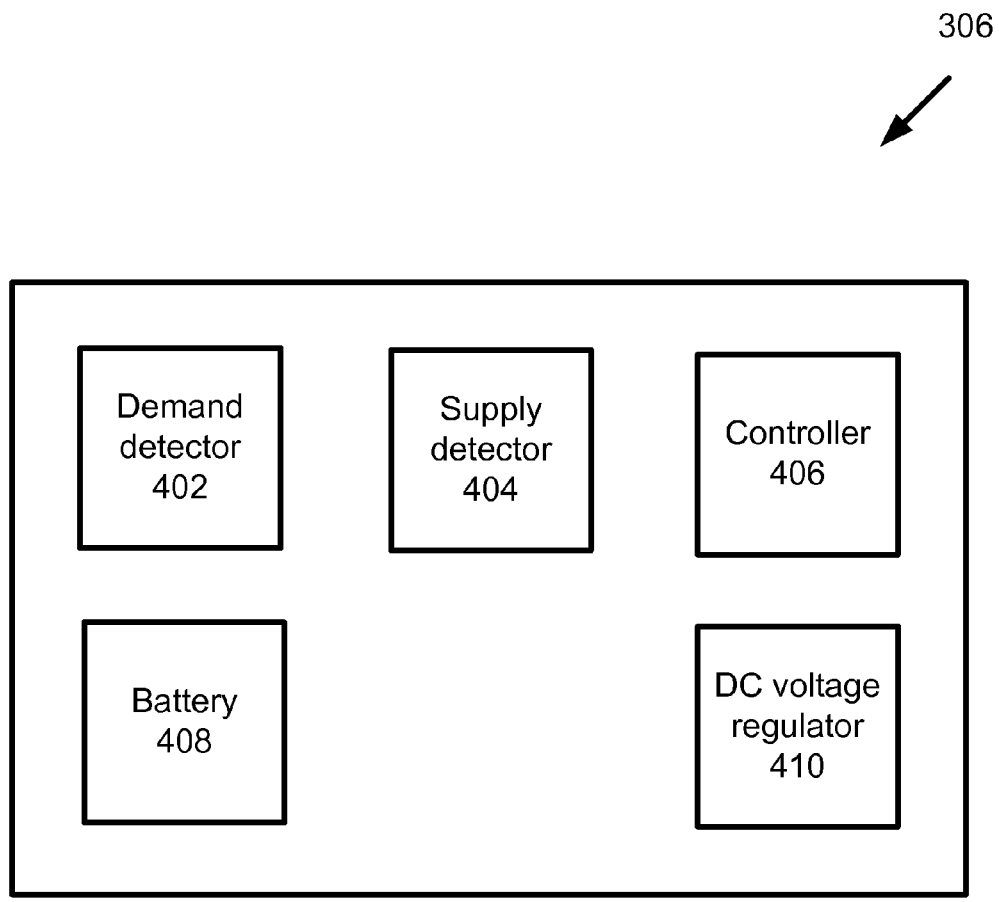
FIG. 4 is a functional block diagram of a power management device of the power supply system.

FIG. 4 is a functional block diagram of the power management device 306. The device 306 comprises a demand detector 402 and a supply detector 404. The detector 402 is used to detect the required DC power for the operations of the second group of appliances 312. The detector 404 is used to detect the DC power generated by the local alternative power source 104 and the DC power available from the remote alternative power source 108. The operations of detecting the demand and the supply are controlled by a controller 406. The controller 406 determines through the demand detector 402 the required DC power for all connected second group of appliances.

According to one aspect of the operation of the demand detector 402, the available DC power from 104 and 108 supplemented by the DC power drawn from a battery 408 may be used to supply temporarily DC power requirement for all connected appliances of the second group. The required DC power is therefore determined by adding the DC power drawn from 104/108 and from the battery 408. If the DC power is indeed required from the battery 408, the AC power from the power grid 106 will be used to replace the DC power from the battery. If the DC power is not required from the battery 408, the DC power generated from the alternative power sources 104/108 is sufficient for powering the appliances from the second group and the surplus DC power from the local source 104 will be stored in the battery 408. The detector 402 may be an operational procedure represented by a software module. 402 may also comprise hardware and/or firmware. It should be noted that the appliances from the first group are always powered by the AC power supply 302.

The battery 408 may be a re-chargeable battery. According to one implementation, 408 may be a deep-cycle re-chargeable battery as typically adopted for a solar system. According to another implementation, the battery 408 may also be charged by the AC power from the power grid 106. The power stored in the battery 408 may be used to power the appliances from the second group while the alternative power sources 104/108 do not supply the stable DC power such as for example, when solar systems cease to generate DC power at the night. The power stored in the battery 408 may be used at the night for the appliances from the second group. However, it should be noted that the battery 408 should reserve a minimum amount of power to support the operation of the power management device 406.

According to another aspect of the present invention, the surplus power generated by the local alternative power source 104 may also be sent to the DC power distribution unit 112 to power electrical appliances from the other power consumption units. Since the DC power is injected to the distribution unit directly, no inverter is required. Power loss because of the use of inverter can be avoided and the cost of distributing the DC electrical power generated by the alternative source can be reduced.

A DC voltage regulator 410 is also included in the device 306 as shown in FIG. 4. The DC power supply 304 generated from the alternative power sources 104/108 may need to be regulated before it is consumed by the electrical appliances.

Because the AC power from the power grid 106 is always available for the system 100, the controller 406 has a feature to use the AC power as a backup power whenever it is required such as for example, when the local and remote alternative power sources are malfunction due to technical problems. It is important that such a default feature is implemented to prevent disruption of operations of the appliances.

Figure 5:
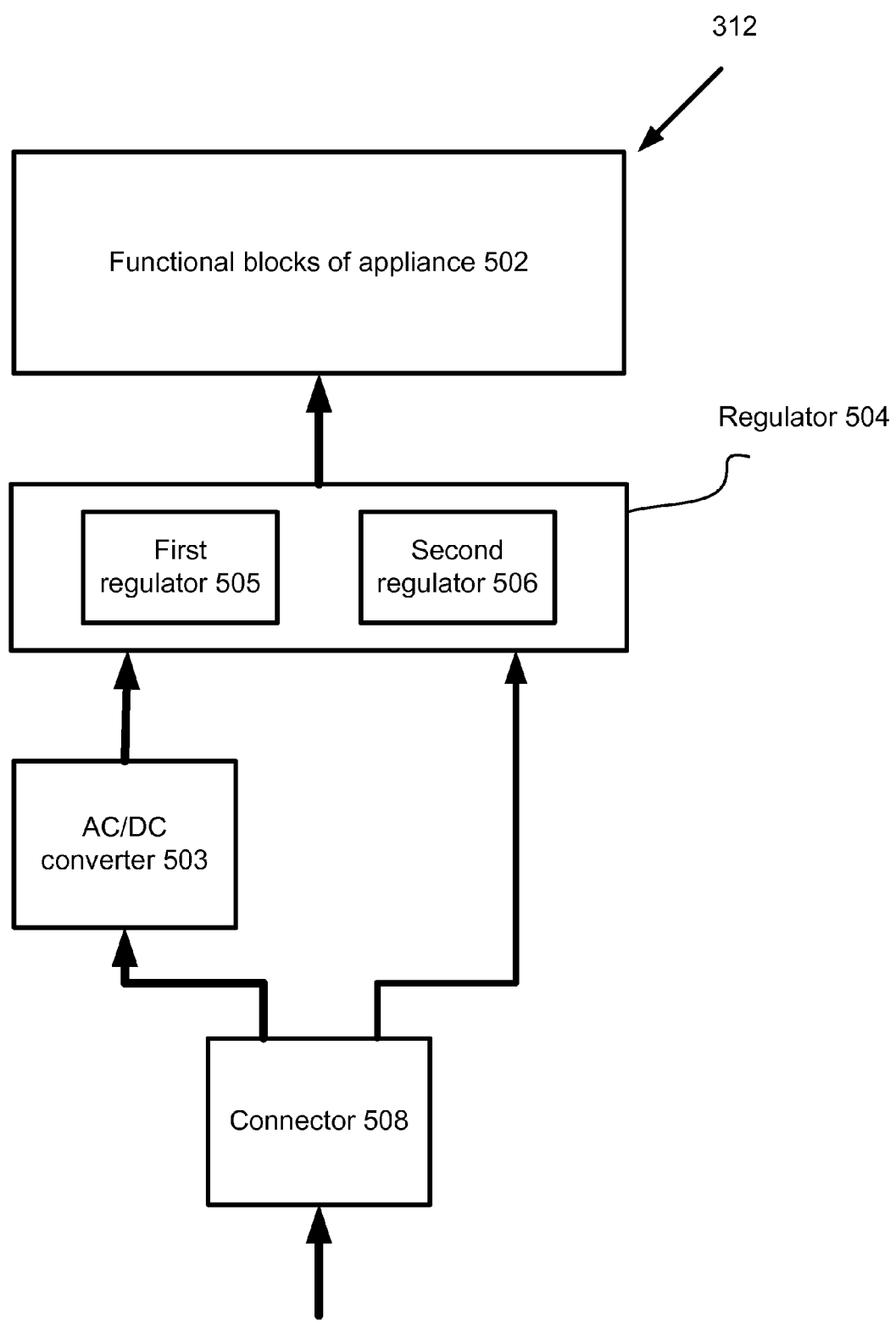
FIG. 5 is a schematic diagram of the appliance that receives AC and/or DC power supplies.

Functional blocks of an exemplary appliance 312 from the second group are further illustrated in FIG. 5. Block 502 represents all functional blocks of the appliance except for the power supply unit of the appliance. The power supply unit comprises an AC path including an AC/DC converter 503 and a voltage regulator 504. The regulator 504 comprises a first voltage regulator 505 for regulating the output voltage from the AC/DC converter 503 for the operation of 502. The unit further comprises a DC path for receiving power from the alternative power sources 104/108 through the power management device 306 and the switch 308. The received DC power may be further regulated by the voltage regulator 504 including the second voltage regulator 506 to satisfy the voltage requirement of 502. The two power paths are connected to the appliance through a connector 508 including one connection mechanism for AC power and another connection mechanism for the DC power. The connection mechanisms may be implemented in a similar manner as a conventional electrical plug and slot.

According to one aspect of the present invention, one of the two power paths is selected by the controller 406 of the power management device 306. The selection is based upon the generated and required DC power. If the DC path is selected, 502 is connected by the connector 508 to the DC power supply 304 through the power management device 306 and the switch 308. If the AC path is selected, 502 is connected by the connector 508 to the AC power supply 302.

Figure 6:
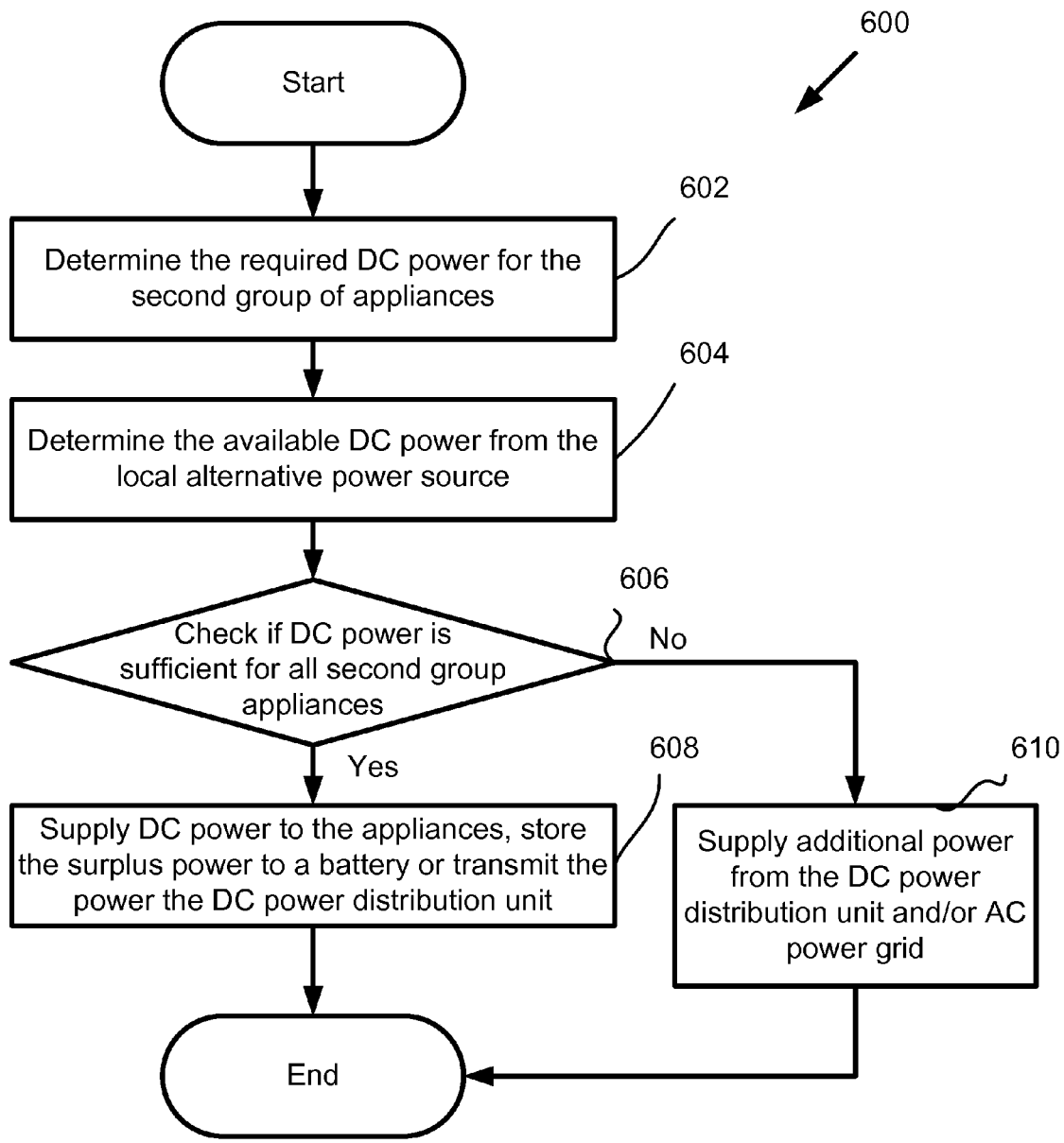
FIG. 6 is a flow diagram depicting steps of the operation of the power supply system.

FIG. 6 is a flow diagram depicting steps of a process illustrating an exemplary operation of the power supply system 100. Process 600 starts with step 602 that the DC power required for powering all second group appliances from the consumption unit is determined by the demand detector 402 controlled by the controller 406. The generated DC power from the local alternative power source 104 is determined in step 604 by the supply detector 404. In step 606, the controller 406 checks if the generated DC power is sufficient for powering all the second group appliances. If the result is positive, the DC power is directed in step 608 to power the appliances and the surplus power is either stored in the battery 408 or sent to the DC power distribution unit 112. If the result is negative in step 606, all generated DC power is consumed and additional DC power from the remote alternative source 108 and/or from the AC power grid 106 are used to supplement the second group appliances 312 in step 610.

Figure 7:
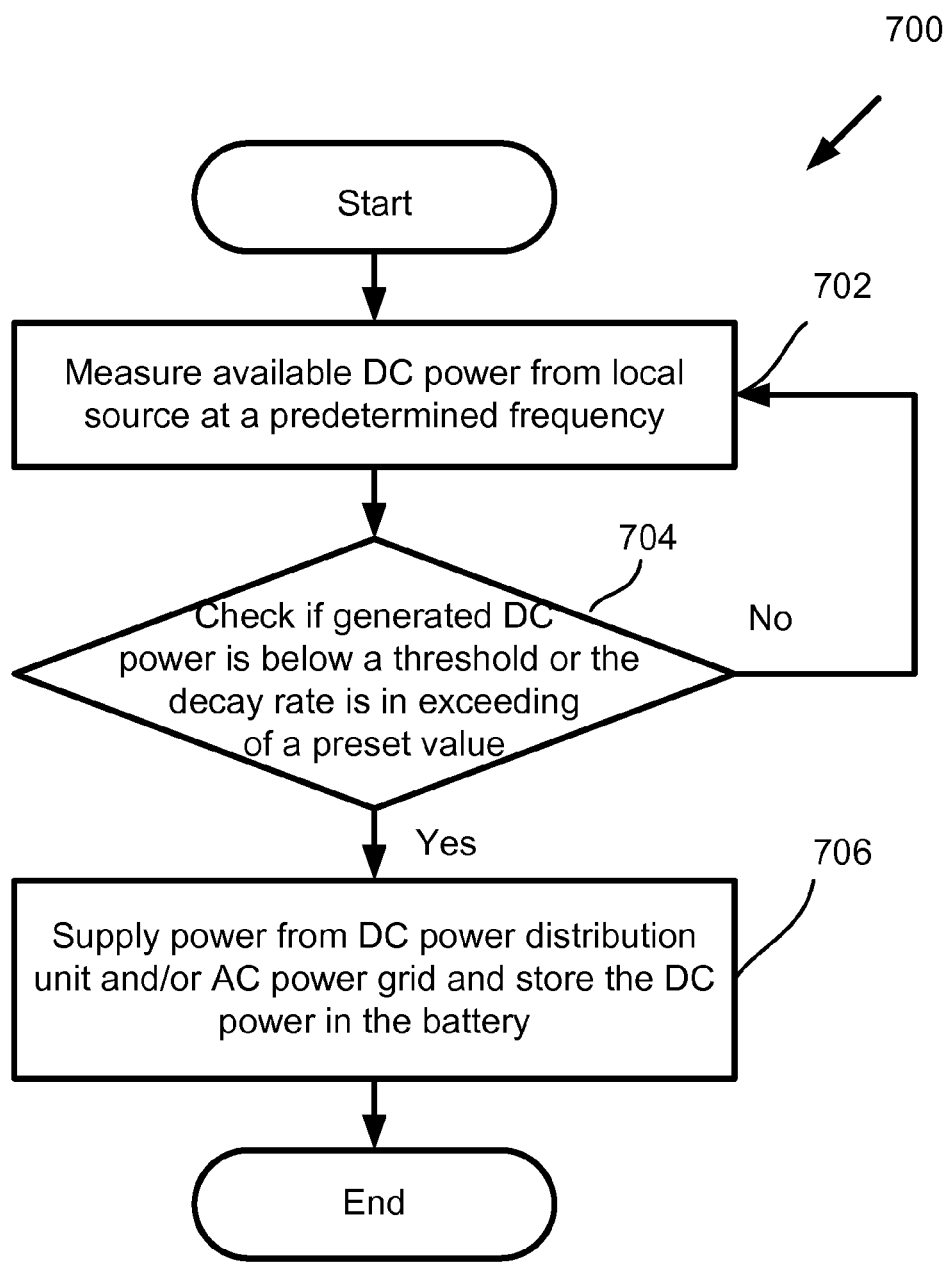
FIG. 7 is a flow diagram depicting steps of a process illustrating the operation of the power supply system when the generated DC power is no long a stable source.

FIG. 7 is a flow diagram depicting steps of a process 700 illustrating an exemplary operation of the power supply system 100 when the generated DC power from the local alternative source 104 is no longer a stable one. The process 700 starts with step 702 that the generated DC power from 104 is measured by the supply detector 404 in a predetermined frequency such as for example, every five minutes. In step 704, the controller 406 checks if the generated DC power is below a threshold or the decay rate of the DC power is in exceeding of a preset value. If the solar system is employed in the local alternative power source 104, the generated DC power is reduced quickly when it is near the sunset. If the result is positive according to the step 704, the additional DC power from the remote alternative source 108 and/or the AC power from the power grid 106 are directed to the second group appliances being powered by the DC power from the local source 104 in step 706. The generated DC power, although unstable, may still be stored in the battery 408. The generated DC power may also be simply abandoned.

The invention claimed is:

1. A power supply system for supplying electrical power to a power consumption unit comprising a plurality of electrical appliances including a first group of appliances configured for receiving AC power only and a second group of appliances configured for receiving DC or AC power, the system comprising:
   (a) a first means of power supply providing AC power from a power grid through an AC power distribution unit;
   (b) a second means of power supply providing DC power generated by one or a plurality of alternative power sources remotely located to the consumption unit through a DC power distribution unit;
   (c) a third means of power supply providing DC power through one or a plurality of alternative power sources locally located to the power consumption unit; and
   (d) a means of selecting the power supplies for the second group of appliances by a power management device to minimize the AC power consumption,
   wherein said power management device further comprising:
      a. a power demand detector for detecting DC power requirements for the second group of appliances;
      b. a power supply detector for detecting DC power generated from the alternative power sources located locally to the consumption unit and DC power available from the DC power distribution unit;
      c. a controller for controlling operations of said power management device;
      d. a voltage regulator for regulating the DC power to meet requirements of the appliances; and
      e. a re-chargeable battery for storing surplus DC power.

2. The system as recited in claim 1, wherein the AC power distribution unit further comprising conventional AC power transmission lines.

3. The system as recited in claim 1, wherein the DC power distribution unit further comprising dedicated power transmission lines.

4. The system as recited in claim 1, wherein said alternative power sources either remotely or locally located to the consumption unit further comprising one or a plurality of solar systems.

5. The system as recited in claim 1, wherein said alternative power sources either remotely or locally located to the consumption unit further comprising one or a plurality of wind turbines including a rotator, a gearbox, a generator and a rectifier for converting AC power from the generator into DC power.

6. The system as recited in claim 1, wherein the appliances from the second group further comprising a power management unit including an AC power supply path and a DC power supply path, wherein said one of two paths may be selected by said power management device.

7. The system as recited in claim 1, wherein said system further comprising a switch for connecting anyone of the appliances from the second group to either the DC power or the AC power.

8. The system as recited in claim 1, wherein said power consumption unit further comprising a residential unit or a commercial unit.

9. A method of generating and delivering electrical power to a power consumption unit comprising a plurality of electrical appliances, the method comprising:
  (a) delivering AC power from a power grid to the consumption unit through an AC power distribution unit;
  (b) generating DC power from one or a plurality of alternative power sources remotely located to the consumption unit and delivering the generated DC power to the consumption unit through a DC power distribution unit;
  (c) generating DC power from one or a plurality of alternative power sources located locally to the consumption unit; and
  (d) selecting one or more power sources by a power management device for the consumption unit to minimize the AC power consumption from the power grid, wherein said step of "selecting" further comprising:
    a. determining the DC power generated from the local alternative power sources;
    b. determining required DC power for a group of appliances configured for receiving AC or DC power;
    c. supplying the generated DC power from the local alternative power sources to said group of appliances if the required DC power is more than the generated one; or
    d. supplying the required DC power to said group of appliances and storing surplus DC power to a battery if the required DC power is less than the generated DC power from the local alternative power sources.

10. The method as recited in claim 9, wherein said method further comprising sending surplus DC power generated from the local alternative power sources to the DC power distribution unit.

11. The method as recited in claim 9, wherein said method further comprising storing the DC power generated from the local alternative power sources to a battery if the DC power is below a threshold or a decay rate of the generated DC power is in exceeding of a preset value.

12. The method as recited in claim 9, wherein said alternative power sources comprising one or a plurality of solar systems.

13. The method as recited in claim 9, wherein said alternative power sources comprising one or a plurality of wind turbines including a rotator, a gearbox, a generator and a rectifier for converting the AC power from the generator into the DC power.

* * * * *